No. 886,823. PATENTED MAY 5, 1908.
L. LAMMER.
DISPENSING CABINET.
APPLICATION FILED JULY 25, 1907.
3 SHEETS—SHEET 1.
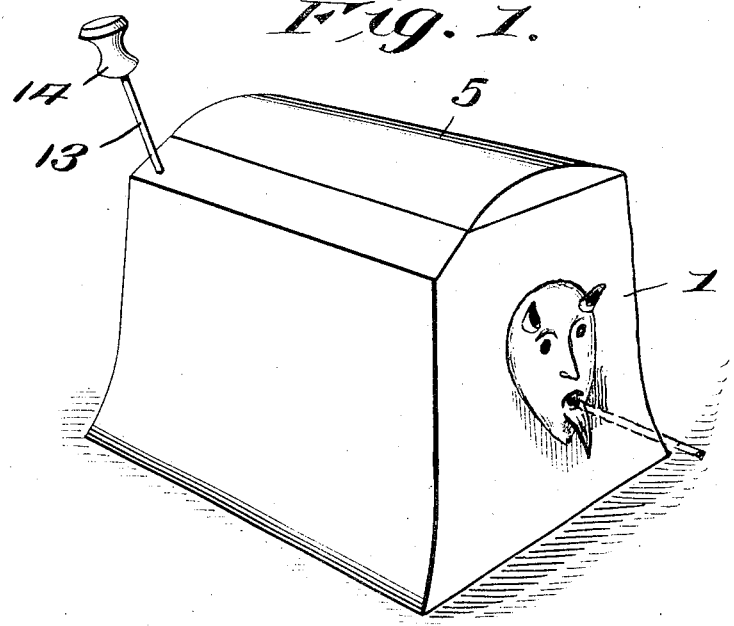
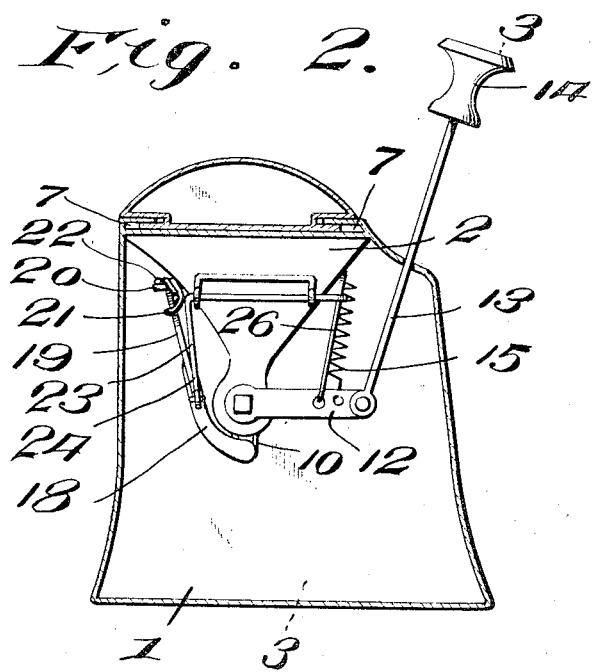
WITNESSES: INVENTOR
L. Lammer
BY
W. J. FitzGerald
Attorneys No. 886,823. PATENTED MAY 5, 1908.
L. LAMMER.
DISPENSING CABINET.
APPLICATION FILED JULY 25, 1907.
3 SHEETS—SHEET 2.
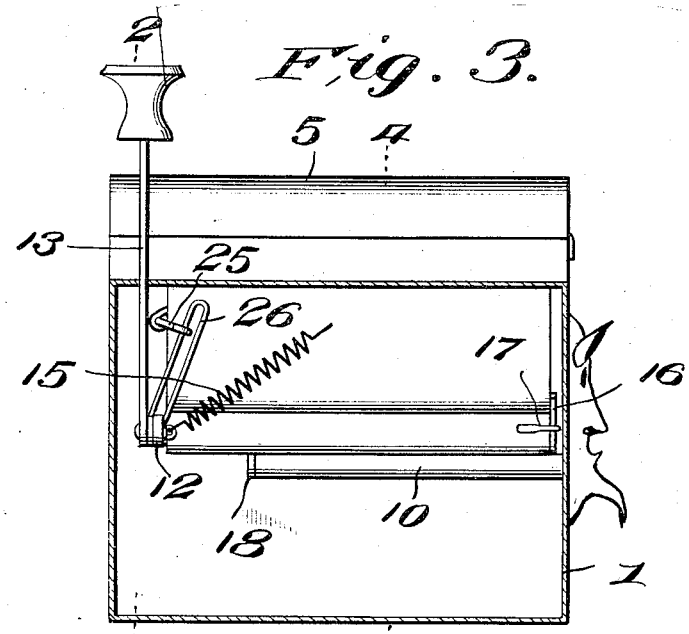
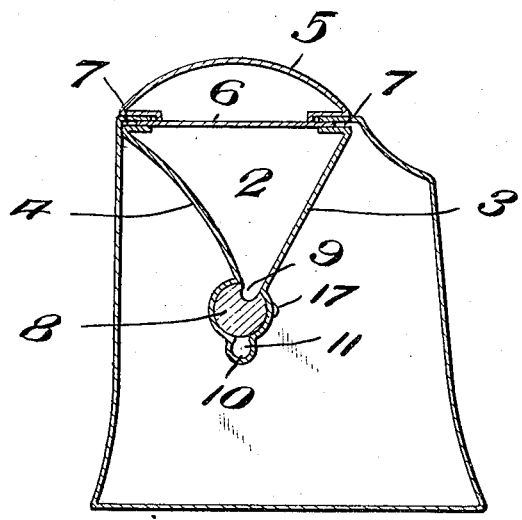
WITNESSES:
INVENTOR
L. Lammer
BY
W.J. FitzGerald
Attorneys No. 886,823. PATENTED MAY 5, 1908.
L. LAMMER.
DISPENSING CABINET.
APPLICATION FILED JULY 25, 1907.
3 SHEETS—SHEET 3.
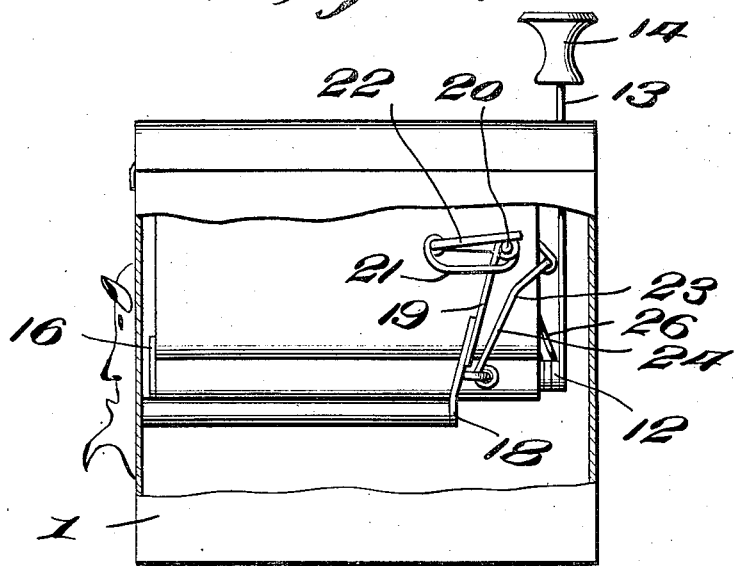
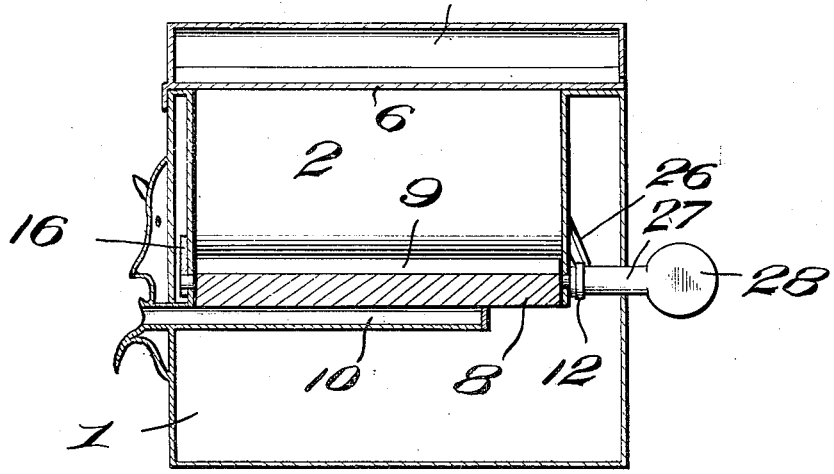
WITNESSES: INVENTOR
L. Lammer
BY
Attorneys

UNITED STATES PATENT OFFICE.

LOUIS LAMMER, OF NEW YORK, N. Y.

DISPENSING-CABINET.

No. 886,823.

Specification of Letters Patent.

Patented May 5, 1908.

Application filed July 25, 1907. Serial No. 385,596.

*To all whom it may concern:*

Be it known that I, LOUIS LAMMER, a citizen of the United States, residing at New York, in the county of New York and State of New York, have invented certain new and useful Improvements in Dispensing-Cabinets; and I do hereby declare the following to be a full, clear, and exact description of the invention, such as will enable others skilled in the art to which it appertains to make and use the same.

My invention relates to new and useful improvements in dispensing cabinets and more particularly to that class adapted to be used for dispensing tooth picks, matches and like articles and my object is to provide means for delivering the tooth picks, etc. from the cabinet one at a time.

A further object is to provide means to remove the pick from the cabinet after the same has been separated from the remainder of the picks contained in the pick receptacle.

Other objects and advantages will be hereinafter referred to and more particularly pointed out in the claims.

In the accompanying drawings which are made a part of this application, Figure 1 is a perspective view of my improved dispensing cabinet complete. Fig. 2 is a sectional view as seen on line 2—2, Fig. 3. Fig. 3 is a sectional view as seen on line 3—3, Fig. 2. Fig. 4 is a sectional view, as seen on line 4—4, Fig. 3. Fig. 5 is an elevation of the opposite side of the cabinet from that shown in Fig. 3, parts of the casing being broken away, and, Fig. 6 is a longitudinal, central, sectional view of a slightly modified form of the cabinet.

Referring to the drawings in which similar reference numerals designate corresponding parts throughout the several views, 1 indicates the casing or housing of my improved dispensing cabinet, in the upper end of which is provided a hopper 2, the side walls of said hopper being preferably tapered towards each other, so that said hopper will be substantially wedge-shaped, the wall 3 of the hopper being straight, while the wall 4 is slightly curved, which will result in causing the picks contained in the hopper to move downwardly and towards the wall 3.

The upper edge of the casing 1 is provided with an opening, so that the hopper 2 may be readily filled with picks or matches, and in order to cover the hopper after the same has been filled, I provide a sliding closure 5, on the lower edge of which is a plate 6, the edges of the plate extending beyond the lower edges of the closure and adapted to enter channels 7 formed along the upper edges of the hopper 2.

The lower edges of the walls 3 and 4 are a sufficient distance apart to allow but one pick or match to pass therethrough at a time, and in order to hold the remainder of the picks in the hopper after one has passed through the opening between the walls, or until such time as it is desired to deliver another pick, a drum 8 is located immediately below the lower edges of the walls of the hopper and is substantially the same length as the hopper, said drum having a recess 9, extending longitudinally therein, which is adapted to normally register with the opening between the lower edges of the walls 3 and 4 and receive the pick from the opening.

After the pick has been deposited in the recess 9, the drum 8 is rotated substantially half its circumference, the periphery of the drum completely closing the opening between the walls 3 and 4 and preventing the remainder of the picks from passing through the opening.

A discharge tube 10 is placed immediately below the drum 8 and extends longitudinally therewith, said tube having a slot 11 in its upper edge, so that when the drum is rotated, the pick will be deposited in the discharge tube 10, when by again returning the drum to its initial position, another pick will descend into the recess 9 when the above operation may be repeated.

One end of the drum 8 is provided with a laterally extending lever 12, which is fixed to the drum and has pivotally secured to its outer end a push rod 13, said rod extending upwardly through an opening in the casing 1 and having a button 14 at its upper end, so that downward pressure may be directed on the push rod and lever to rotate the drum.

The lever 12 is normally held in its initial or horizontal position by means of a spring 15, one end of which is fixed to one wall of the hopper, while the opposite end thereof is secured adjacent the outer end of the lever 12, so that when said lever is depressed to rotate the drum, tension will be exerted upon the spring 15 and it will be seen that as soon as pressure is removed from the button, the spring will immediately elevate the lever and again bring the recess 9 in alinement with the opening between the lower edges of the walls 3 and 4, the rotation of the drum in this direction being limited by means of a stop 16 carried by the forward end of the drum 8 engaging a stop pin 17, thereby positively locating the recess 9 below the opening between the walls 3 and 4.

In order to place the pick in position to be grasped by the user, I provide means for moving the pick endwise in the discharge tube 10, so that a portion of the pick will protrude beyond one end of the casing 1, the tube 10, as best shown in Fig. 6 being extended beyond the end of the casing.

The pick is moved longitudinally in the tube 10 by means of a spring operated mallet 18, which is so arranged that when the lever 12 is being depressed to deposit the pick in the tube 10, the mallet will be moved away from the inner end of the tube, so that as soon as the pick is released from the recess 9 and the tension removed from the button 14, the mallet 18 will be caused to strike the end of the pick a sufficient blow to throw the pick forwardly in the tube 10, by means of a spring arm 19, to which the mallet is secured, the upper end of the spring arm being secured to one side of the hopper 2 in any preferred manner, as by coiling a portion of the spring around a stud 20 and securing the free end 21 thereof to a keeper 22.

The inner end of the tube 10 is placed a distance from the end of the drum 8, so that when the pick is deposited in the tube, a portion thereof will project beyond the inner end of the tube and in position to be engaged by the mallet 18.

The striking portion of the mallet 18 is moved out of the path of the descending pick by means of a crank 23, said crank being pivotally mounted upon one end of the hopper 2 and having one of its arms 24 secured to the mallet 18, while the opposite arm 25 is movably secured to a link 26 carried by the lever 12 and it will be seen that when the lever 12 is depressed, the crank 23 will be rocked and the mallet 18 moved endwise of the drum 8 and out of the path of the descending pick and that as soon as the downward pressure is removed from the lever 12, the spring arm 19 will move the mallet against the end of the pick with considerable force, thereby moving the pick outwardly, as best shown in Fig. 1 of the drawings by dotted lines.

In operation, the closure 5 is first removed and the hopper 2 filled with picks, the lowermost pick in the hopper entering the recess 9 in the drum 8 and when it is desired to obtain a pick, downward pressure is directed on the button 14, thereby rotating the drum 8 and moving the mallet 18 out of the path of the descending pick. After the button 14 has been depressed to its fullest extent, pressure is removed from the button, whereupon the mallet will be brought into engagement with the inner end of the pick and move the same outwardly a sufficient distance to be grasped by the user, while at the same time the drum 8 will be returned to its initial position to receive a new pick by means of the spring 15, thus dispensing the picks or other articles in the hopper one at a time.

In Fig. 6 of the drawing, I have shown a slightly modified means for rotating the drum and, in this instance, the push rod 13 is dispensed with and a shaft 27 fixed to the end of the drum 8 and extended through the rear wall of the casing 1, the extreme outer end of the shaft 27 being provided with a wing 28, so that the same may be readily grasped and the drum 8 rotated.

It will thus be seen that I have provided a very cheap and economical form of dispensing cabinet and one wherein the articles may be dispensed one at a time and it will further be seen that by arranging the casing in the manner described, the operating parts of the device cannot be tampered with or the utility of the device destroyed.

What I claim is—

1. The herein described dispensing cabinet, comprising a casing having an opening in the upper edge thereof, a hopper immediately below said opening, the walls of which are tapered inwardly and one of said walls being curved, a drum rotatably mounted below said hopper and having a recess therein, adapted to register with the space between the lower edges of the walls of the hopper, a discharge tube below said drum of less length than the drum and having one of its ends extended through the wall of the casing, a lever fixed to one end of said drum, means to depress said lever to rotate the drum, a link carried by said lever, a spring arm secured to one side of said hopper, a mallet fixed to the lower end of said spring arm and adapted to register with one end of the discharge tube, a crank pivotally secured to one end of the hopper, said crank having arms, one of which is secured to said mallet and the other to said link, whereby when the lever is depressed to rotate the drum, the mallet will be moved away from the end of the discharge tube to allow the object to descend into said tube and will deliver a blow to the end of the object when the downward pressure is released from the lever.

2. In a dispensing cabinet of the class described, the combination with a casing, having a hopper therein, the walls of said hopper being tapered inwardly and one of said walls being curved; of a drum below the lower edge of said hopper, said drum having a recess in the face thereof, adapted to register with the space between the lower edges of said walls, a discharge tube below said drum of less length than the drum, a lever fixed to one end of said drum, means to depress said lever, a spring arm fixed at one end to said hopper and at the opposite end to said lever, whereby the lever will be returned to its initial position, means to limit the movement of said drum in one direction, a link secured to said lever, a crank pivoted to the hopper and having one of its ends secured to said link and means connected to the opposite end of said crank adapted to expel an object from the tube by force.

3. In a dispensing cabinet of the class described, the combination with a hopper, having an opening in its lower edge, a drum below said hopper and a discharge tube below said drum; of a lever, means to depress said lever and rotate the drum, a spring arm carried by said hopper, a mallet on said spring arm adapted to extend in the path of said discharge tube, a link carried by said lever and means disposed between said link and mallet, whereby when the lever is depressed, the mallet will be moved away from said discharge tube when the drum is rotated.

In testimony whereof I have signed my name to this specification in the presence of two subscribing witnesses.

LOUIS LAMMER.

Witnesses:
JOHN BIELEK,
FRANK GOERG.